UNITED STATES PATENT OFFICE.

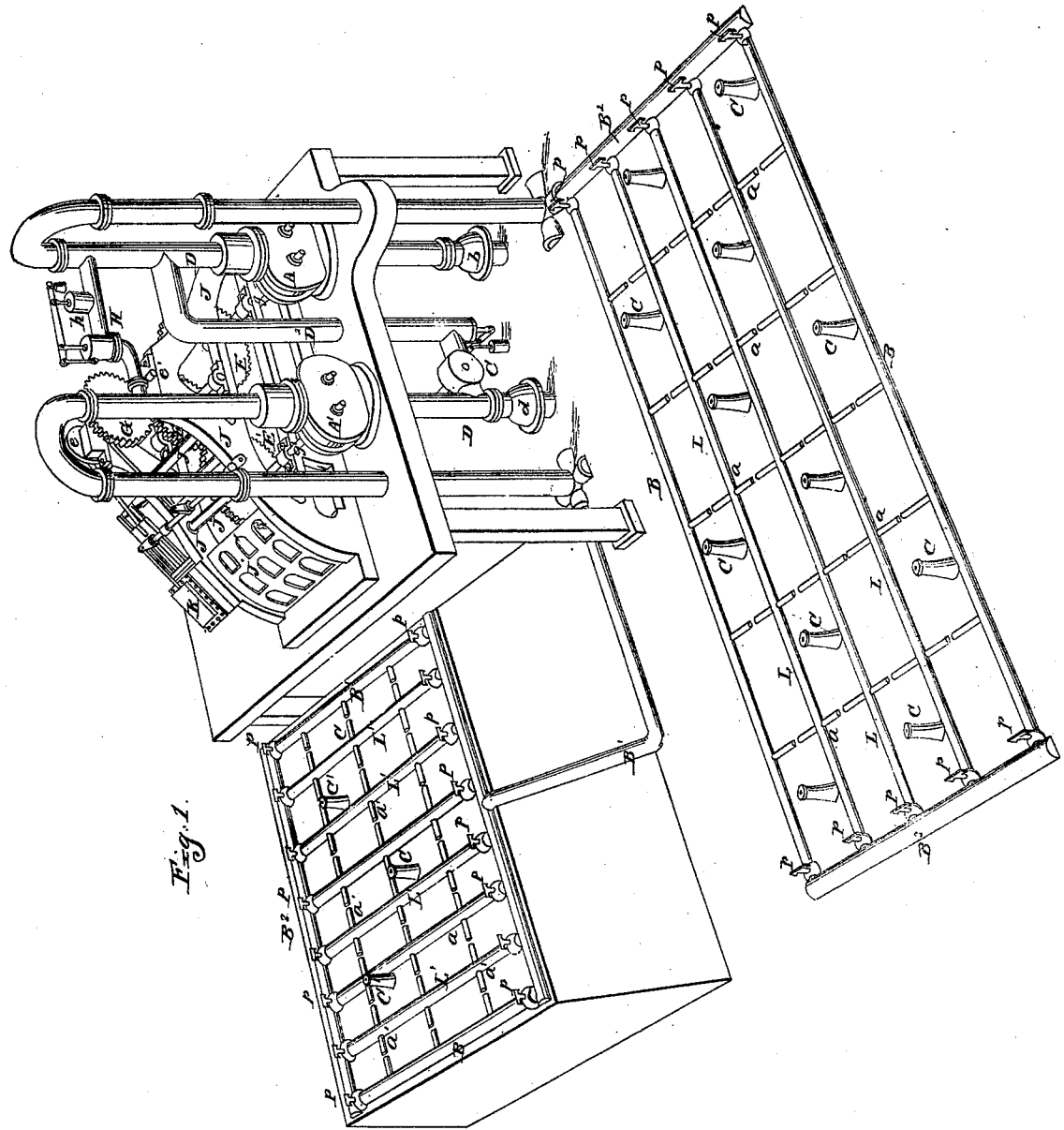

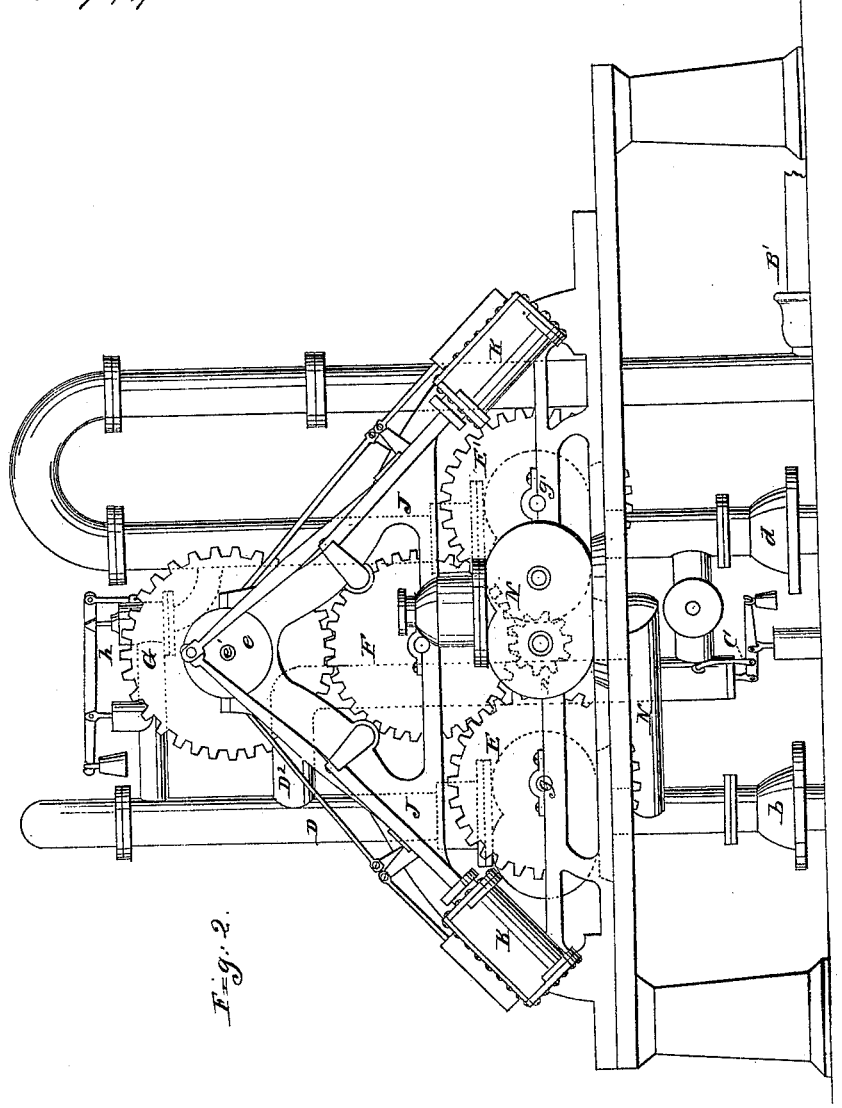

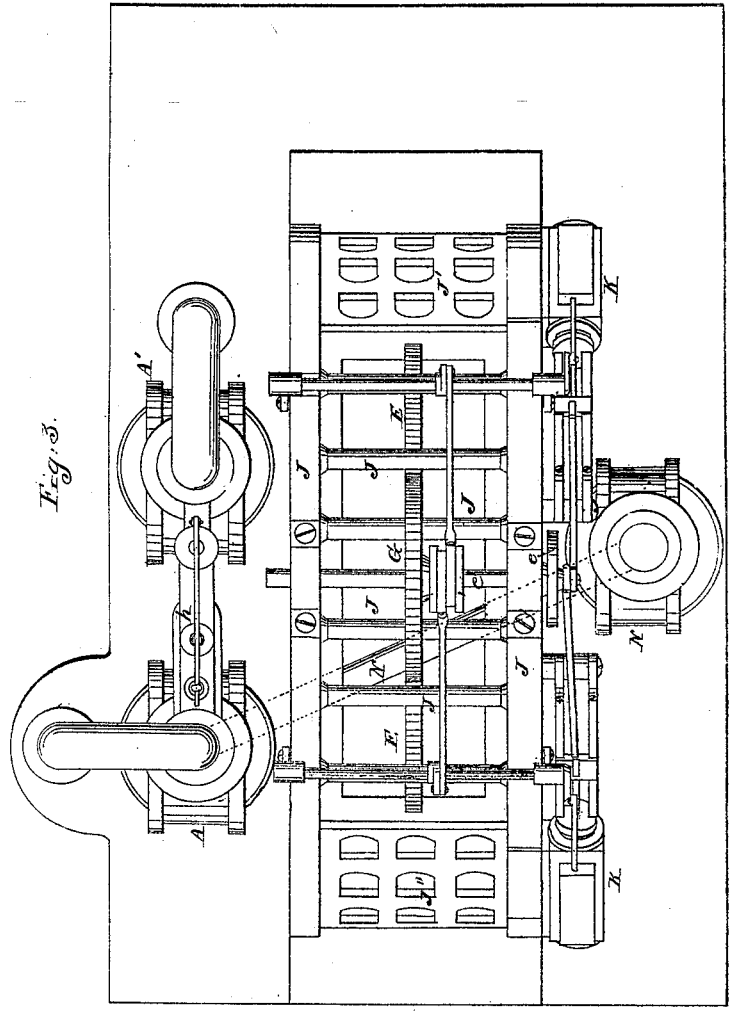

BIRDSILL HOLLY, OF LOCKPORT, NEW YORK.

IMPROVEMENT IN SYSTEMS OF WATER-SUPPLIES FOR CITIES.

Specification forming part of Letters Patent No. 94,746, dated September 14, 1869.

CASE A.

*To all whom it may concern:*

Be it known that I, BIRDSILL HOLLY, of Lockport, in the county of Niagara and State of New York, have invented a new and Improved System of Water-Works for Supplying Cities and Towns with Water; and I do hereby declare that the following is a full, clear, and exact description thereof, reference being had to the accompanying drawings, making part of this specification, in which—

Figure 1, Sheet 1, is a perspective view, illustrating my improved system for supplying cities and towns with water.

Fig. 2, Sheet 2, is an elevation of the pumping-engine.

Fig. 3, Sheet 2, is a plan view of the same.

Similar letters of reference indicate corresponding parts in the several figures.

This object of my invention is not only to supply cities with water for ordinary purposes, at any desired elevation, without the use of a reservoir or a stand-pipe, or any other contrivance for calling into requisition the principle of the hydrostatic equilibrium, but also to furnish the means of extinguishing fires at several points at the same time, if necessary, and all this without the use of any movable engine for that purpose.

To accomplish this object, I place one or more pumps, or forcing or inducting machines, at some convenient point where the supply of water is accessible, from whence, by a system of pipes, the water may be conducted wherever it is desired, substantially in the same manner as in ordinary cases, the force of the pump or pumps being substituted for the hydrostatic pressure due to the elevation of the source of the supply.

The machinery must be adequate to the amount of water to be supplied, and be endowed with power sufficient for all extraordinary occasions. I prefer for this purpose the use of the "Holly pump," patented in the year 1855, the same to be driven by suitable steam or water power; but I do not limit myself in this respect.

I do not pretend to have been the first to conceive the idea of furnishing water in limited quantities, for ordinary use, by means of a force-pump; nor do I deny that a stationary pump has been employed instead of a movable one in supplying the means for the extinguishment of fires.

My invention consists in conceiving the idea of accomplishing both of these objects at once, and in devising the contrivances for giving practical effect to that main idea.

I will now proceed to describe in what these contrivances consist, referring, for greater perspicuity, to the accompanying drawings, by way of illustration, and to enable others to understand and apply my invention practically.

In the accompanying drawings, A A' represent two forcing-pumps, arranged at the source from which water is to be derived with which to supply the city.

B B' are water-pipes, leading along the streets and avenues of the city which is to be supplied with water, furnishing a convenient opportunity for its distribution along the cross-streets by means of distributing-pipes $a\ a'$.

C C' represent the hydrants or force-plugs, placed at convenient distances, so that, by means of hose attached to each, water may be supplied at any point for the extinguishment of fires.

The pumping apparatus may be placed several miles distant from the city; but, in that case, the main or mains leading therefrom must be of a size sufficient to prevent any considerable friction along the internal surfaces of the mains, which would be carried by a rapid current passing through a main of small diameter.

It must also be remembered that, where there is an elbow or other change of direction in a water-pipe to be used in this connection, especially those of larger diameter, particular care must be had to prevent the disturbing effects of lateral pressure upon the pipes, when there is no countervailing pressure in the opposite direction, to preserve the equilibrium. A pipe of ten inches in diameter, when under a pressure of two hundred pounds to the square inch, would, in case it turned at right angles, exert a force of nearly eight tons, tending to force asunder the joints in each branch of the pipe; and, in case it issued from a straight main, at right angles thereto, it would exert a like pressure, tending to force the "main" from its normal position.

All this must be carefully provided for, as a pressure of two hundred pounds to the square inch will be necessary to throw water to the top of a building fifty or sixty feet in height, which stands on an eminence two or three hundred feet higher than the pumping apparatus.

It is essential to the successful operation of my invention that some contrivance should be provided to prevent the pressure upon the pipes within a building from being increased beyond a certain degree by reason of the greater pressure of the water in the street-pipes, for, otherwise, where buildings stood upon very different levels, in order that those most elevated might be supplied at all, a very inconvenient and even dangerous degree of pressure would be felt on the lower ground. This effect would be much more manifest and intolerable in case of fire, when a greatly augmented amount of force would necessarily be applied through the pumps over that which would be requisite at other times. The means which I prefer to adopt for this purpose will be found embodied in my application marked C, and bearing even date with the filing of this. Some device of that nature forms a necessary element in the combination or system which constitutes the invention for which I now ask a patent.

These regulating devices I place at some convenient point in the pipes leading into the buildings.

Another essential element in my system is a contrivance in the nature of a safety-valve, to prevent the disrupting effect of suddenly stopping the flow of water in pipes where the water therein is under a high degree of pressure. For this end, at all exposed points, I employ a contrivance of the nature of that described in my application marked B, and bearing even date with this.

It is also important, where water is to be raised to eminences of considerable elevation, to so combine one pump with another that there shall be a pressure behind one of the pumps, to aid in overcoming the pressure in front of it. This may be done in the manner shown in Sheets 1 and 2 of the drawings.

The pump A is intended for supplying the mains B, leading to the lower distribution, and the pump A' is designed for supplying those mains, B', leading to the high altitude shown in Fig. 1.

Let it be supposed that the pump A supplies the lower mains B, which will consume about nine-tenths of the water used in the city, while one-tenth will have to be raised to the height of two hundred and twenty-five feet, equal to a pressure of one hundred pounds to the square inch. Now, if it be required to raise all the water to the height of two hundred and twenty-five feet, which would be the case if a reservoir were used, it would double the pumping expenses, besides causing great strain on all the pumps when working under that pressure. In order to raise that one-tenth to the height of two hundred and twenty-five feet, with the same pressure on all the working-parts of the pump A, I attach the suction-pipe D of the pump A' to the discharge-pipe D' of pump A.

It will be seen that, with separate mains from pump A' to the high distribution, the water will rise to one-half that height without applying any power to pump A'. Then, as soon as this pump A' is started, and fifty pounds added to the fifty pounds already in the mains from the pump A, we have a pressure of one hundred pounds, or a pressure equal to that given by a reservoir two hundred and twenty-five feet high. By this means, the pumping apparatus is not subjected to undue strain.

In case of a fire, where an additional amount of water is expended, and where that water is to be thrown to a greater elevation, an augmented force and efficacy are to be given to the pumps. I therefore propose to render this change automatic, so far, at least, as to communicate intelligence to the engineer at the pumps that an additional amount of water and a higher degree of pressure are called for.

To understand the proposed arrangement, it is necessary to remember that where water is only used for ordinary purposes no great and sudden change in the amount called for is likely to take place.

The engineer at the pumps should be furnished with a contrivance in the nature of a barometer, which is connected with the pipes, and serves to show the degree of pressure therein. A comparatively great degree of uniformity will be observed in the amount of pressure which, from moment to moment, will be thus indicated; but, whenever a fire-plug is opened, such is the incompressibility of water that the effect will be instantly perceivable at headquarters. A simple contrivance will cause a bell to ring, for the purpose of giving the requisite information to the engineer, and will thus indicate to him the necessity of increasing the supply of water, and also the degree of pressure.

An apparatus in the nature of a fire-alarm, operated by electricity, may be employed for this purpose, which would communicate more specific and accurate intelligence in such cases; but the contrivance above described will answer a tolerable purpose. Experience shows that the information thus communicated in case of fire is almost instantaneous through distances of several miles in extent.

In the accompanying drawings, J represent a double ogee frame, which is strengthened by the webbing J' J' and stretchers $j$ $j$, and adapted for supporting, upon one side of it, two quarter-crank engines.

The piston-rods of these engines are both connected to a wrist-pin on a crank-plate, $e$, the shaft $e'$ of which carries a spur-wheel, G, and also the eccentric to which the slide-valve rods of the engines are applied.

The spur-wheel G is arranged above and engages with a spur-wheel, F, which latter is arranged above and engages with a pinion, $n$, (shown in dotted lines Fig. 2,) which is keyed on the shaft of a rotary engine, N.

On opposite sides of the pinion $n$, and keyed on shafts $g\ g'$ of the force-pumps A A' are spur-wheels E E', either one or both of which can be engaged with or disengaged from the spur-wheel F, at pleasure, by means of suitable shifting-clutches.

It will be seen that either one or both of the pumps can be operated at pleasure by shifting the wheels E E' on the shafts $g\ g'$; also that the power of the rotary engine N' can be brought into requisition at pleasure.

The suction-pipe of pump A' communicates with the pumping-well, and also with the discharge-pipe of pump A, through pipe D', so as to take water either from said well or discharge-pipe, and the suction-pipe of the pump A' has a foot-valve, $d$, applied to it, to prevent the escape of water from pump A, when it is being supplied from the pump A'.

A safety-valve, $c$, is applied to the pipe D, and a safety-valve, $h$, is applied to a pipe, H, which forms a communication between the discharge-pipes of the two pumps A A'.

By an arrangement of street-pipes (shown in Fig. 1) I am enabled to do away with the large and expensive mains hitherto used, and substitute a number of small parallel mains in their stead.

Under this arrangement, the water is taken from the pumps and large mains until it enters the pipe $B^2$, (see lower grade of pipes, Fig. 2;) then, instead of passing on, perhaps, for many miles through a single street, the water is carried off by branch pipes L, each one of which supplies its respective street with water, and all terminating in a pipe, $B^3$.

Each one of the parallel pipes is provided, at its opposite ends, with valves $p$, by closing which the water will be cut off, and repairs can be made any where on that line, without interfering with the current of water, on any other line of pipes.

It will be seen, from the above description, that the machinery which is kept in constant activity for supplying a city with water for ordinary purposes, can almost, with rapidity of thought, be converted into one great fire-engine, which is present in all parts of the city at once, without requiring time or labor to be transported from one place to another, and capable of extinguishing fires in many places at one and the same time.

I do not, in this patent, lay claim to any of the contrivances above described, but what I do claim as new, and desire to secure by Letters Patent, is—

1. The described system, which, while it will supply a city with water, distributed for ordinary purposes, without the use of a reservoir or stand-pipe, or enlarged container of any kind, will, by the concentration of its currents, serve as an apparatus for extinguishing fires, substantially in the manner herein described.

2. In the above-described apparatus, the combination of the force-pumps A A' and connecting-pipe $D^2$, with engines applied so as to operate either one or both of said pumps at pleasure, substantially as described.

BIRDSILL HOLLY.

Witnesses:
C. G. HILDRETH,
F. E ROGERS.